(12) United States Patent
Nakamura

(10) Patent No.: US 7,914,728 B2
(45) Date of Patent: Mar. 29, 2011

(54) METHOD FOR MANUFACTURING POROUS HONEYCOMB STRUCTURE

(75) Inventor: Tomoo Nakamura, Cape Town (ZA)

(73) Assignee: NGK Insulators, Ltd., Nagoya (JP)

( * ) Notice: Subject to any disclaimer, the term of this patent is extended or adjusted under 35 U.S.C. 154(b) by 63 days.

(21) Appl. No.: 11/631,192

(22) PCT Filed: Jul. 14, 2005

(86) PCT No.: PCT/JP2005/013035
§ 371 (c)(1),
(2), (4) Date: Dec. 29, 2006

(87) PCT Pub. No.: WO2006/006667
PCT Pub. Date: Jan. 19, 2006

(65) Prior Publication Data
US 2008/0029938 A1    Feb. 7, 2008

(30) Foreign Application Priority Data

Jul. 14, 2004  (JP) ................................ 2004-207308

(51) Int. Cl.
C04B 35/64 (2006.01)
B32B 3/12 (2006.01)
B29C 47/12 (2006.01)

(52) U.S. Cl. ..................... 264/631; 264/44; 264/177.12; 428/116

(58) Field of Classification Search ............... 264/43, 264/44, 48, 660, 177.12, 628–631, 652, 171.12; 428/116
See application file for complete search history.

(56) References Cited

U.S. PATENT DOCUMENTS

| | | | | |
|---|---|---|---|---|
| 4,399,052 A * | 8/1983 | Sugino | .......................... | 502/402 |
| 4,490,319 A * | 12/1984 | Lee et al. | ...................... | 264/603 |
| 4,869,944 A * | 9/1989 | Harada et al. | ................... | 428/116 |
| 5,030,398 A * | 7/1991 | Hamanaka et al. | ........... | 264/631 |
| 5,258,150 A * | 11/1993 | Merkel et al. | .................... | 264/43 |
| 5,262,102 A * | 11/1993 | Wada | ............................ | 264/631 |
| 5,427,721 A * | 6/1995 | Brezny et al. | ................... | 264/44 |
| 5,429,779 A * | 7/1995 | Locker et al. | ................. | 264/40.1 |
| 5,552,349 A * | 9/1996 | Ichii et al. | ......................... | 501/9 |
| 5,567,663 A * | 10/1996 | Kotani et al. | ................. | 501/119 |
| 6,238,618 B1 * | 5/2001 | Brundage et al. | ............. | 264/638 |
| 6,300,266 B1 * | 10/2001 | Beall et al. | .................... | 501/119 |
| 6,455,124 B1 * | 9/2002 | Beall et al. | .................... | 428/116 |
| 6,576,579 B2 * | 6/2003 | Merkel | .......................... | 501/102 |
| 6,783,724 B2 * | 8/2004 | Noguchi et al. | ............. | 264/631 |
| 7,223,716 B1 * | 5/2007 | Koike et al. | ................... | 502/439 |
| 2003/0102606 A1 | 6/2003 | Noguchi et al. | | |

(Continued)

FOREIGN PATENT DOCUMENTS

| | | |
|---|---|---|
| CN | 1383421 A | 12/2002 |
| CN | 1476345 A | 2/2004 |
| EP | 1025903 A1 * | 8/2000 |
| EP | 1418032 A2 * | 5/2004 |
| EP | 1604726 A1 * | 12/2005 |
| JP | B2 2543565 | 10/1996 |

(Continued)

*Primary Examiner* — Joseph S Del Sole
*Assistant Examiner* — Dimple Bodawala
(74) *Attorney, Agent, or Firm* — Oliff & Berridge, PLC

(57) ABSTRACT

A method for manufacturing a porous honeycomb structure, which comprises a mixing and kneading step, a forming and then drying step, and a firing and then cooling step of firing a dried honeycomb article to form a fired honeycomb article and then cooling the fired honeycomb article to prepare a porous honeycomb structure, wherein the fired honeycomb article is cooled from the firing temperature under a cooling condition of a temperature falling speed of 100° C./hr or less at least in a temperature region of 800° C. or lower.

9 Claims, 4 Drawing Sheets

U.S. PATENT DOCUMENTS

| | | |
|---|---|---|
| 2003/0143370 A1* | 7/2003 | Noguchi et al. ............ 428/116 |
| 2003/0151155 A1* | 8/2003 | Muroi et al. ................ 264/44 |
| 2003/0165661 A1* | 9/2003 | Noguchi et al. ............ 428/116 |
| 2004/0009865 A1 | 1/2004 | Nair et al. |
| 2004/0053005 A1 | 3/2004 | Hamanaka et al. |
| 2004/0148916 A1* | 8/2004 | Merkel ........................ 55/523 |
| 2005/0253311 A1* | 11/2005 | Nakamura et al. ......... 264/630 |
| 2006/0185335 A1* | 8/2006 | Ichikawa ..................... 55/523 |
| 2006/0257620 A1* | 11/2006 | Noguchi et al. ............ 428/116 |

FOREIGN PATENT DOCUMENTS

| | | |
|---|---|---|
| JP | A 2001-039764 | 2/2001 |
| JP | 2002160976 A * | 6/2002 |
| JP | 2002326881 A * | 11/2002 |
| JP | A 2003-212672 | 7/2003 |
| JP | A 2003-238270 | 8/2003 |
| WO | WO 01/77042 A1 | 10/2001 |
| WO | WO 01/77043 A1 | 10/2001 |

* cited by examiner

METHOD FOR MANUFACTURING POROUS HONEYCOMB STRUCTURE

TECHNICAL FIELD

The present invention relates to a method for producing a porous honeycomb structural body preferably used as a filter for dust-collection use. More particularly, the present invention relates to a method for producing a porous honeycomb structural body which is possible to prevent effectively the occurrence of cracks during manufacturing process.

BACKGROUND ART

A porous honeycomb structural body consisting of ceramics having excellent heat-resistance and corrosion resistance is used as a filter for dust-collection use in the various industrial fields, such as chemical, electric power, industrial waste treatment etc., for the purpose of preventing environment pollution, recovering materials from the high temperature gas, and so on. And the porous honeycomb structural body is preferably used as the filter for dust-collection under high temperature and corrosive gas atmosphere, such as a diesel particulate filter (DPF) capturing the particulate matters (PM) exhausted from diesel engines of automotive diesel engines, for example.

As a filter using the porous honeycomb structural body (hereinafter referred to as a honeycomb filter), there may be exemplified a filter of such a structure, in a porous honeycomb structural body 6 having a plurality of cells 4 having been divided and formed by partition walls 2, that the inlet end face B and outlet end face C of the cells are plugged alternately by the plugged portion 8, for example, like the honeycomb filter 1 as shown in the FIG. 1(a) and FIG. 1(b) (here, the numeral 12 is the outer wall as the reinforce member). In case of the honeycomb filter having this kind of structure, it is possible to obtain a treated gas $G_2$ from which the particulate matters in the treating gas $G_1$ have been removed, because the foreign matters are captured by the partition walls 2 when the treating gas $G_1$ is introduced into the cells 4a from the inlet end face B, while the treated gas $G_2$ which penetrates and flows into the adjacent cells 4b is exhausted from the end face C.

The above-mentioned honeycomb structural body is produced by a method comprising, for example, mixing and kneading a green body material containing an aggregate material particle, a pore forming material and an organic binder and so on with a disperse medium to obtain a green body, shaping the green body to obtain a shaped body, then, drying the shaped body to obtain a dried body, furthermore, firing the dried body. In this producing method, there has been a problem that the firing breaking (cracks) may occur in the obtained porous honeycomb structural body not a little.

It is considered that the occurrence of the above-mentioned cracks is caused by burning the inflammables contained in the fired body during the temperature rising process at the time of firing the dried body (the body to be fired), and the inner temperature of the body to be fired rises rapidly. That is, in the firing temperature rising process, the temperature of the outer portion of the body to be fired rises substantially constant speed following with the temperature rising of the firing atmosphere, on the other hand, the temperature of the central portion of the body to be fired rises with higher speed than temperature rising speed of the firing atmosphere by burning of the inflammables such as the pore forming material and the organic binder contained in the body to be fired. Therefore, it is considered that the difference of the temperature of the inner and outer portion of the body to be fired is to be large, and then the cracks may occur in the porous honeycomb structural body by thermal stress.

As the strategy to solve the above mentioned problem, the process, in which the temperature rising speed of the firing atmosphere is strictly controlled so that the difference of the temperature of the inner and outer portion of the body to be fired may not occur during the temperature rising process at the time of firing the body to be fired, is heretofore employed conventionally. The applicant also has already proposed the method for producing a porous ceramics structural body in which the burning of the organic binder progresses as gentle as possible under the firing atmosphere in which the temperature rising speed is controlled low (that is, rising temperature gradually) at the temperature zone in which the organic binder burns (about 180-300° C.), and the method in which the temperature of the firing atmosphere is risen synchronizing with the temperature of the central portion of the body to be fired within the predetermined temperature range (See, for example, Patent Document 1, Patent Document 2).

Patent Document 1: Japanese Patent No. 2543565
Patent Document 2: JP-A-2003-212672

DISCLOSURE OF THE INVENTION

However, it is the present conditions that both of the above mentioned method can still not prevent completely the cracks occurred in the porous honeycomb structural body even employing these method, even though these methods are very effective from the viewpoint of preventing cracks during firing the body to be fired.

In recent years, particularly, the thinner and thinner tendency of the walls of the porous honeycomb structural body or the higher and higher tendency of the porosity of the same is advancing rapidly, for the purpose of reducing the pressure loss of gas during penetrating the partition walls and improving the processing ability of the filter, therefore, it is the situation that the cracks are easily occurred from the structural view point as compared with the conventional situation. Under these circumstances, the reducing the process yield caused by occurring cracks and the reducing the filtering ability (capturing efficiency) of the filter are going to become serious problems, therefore, the creation of a producing method of the porous honeycomb structural body which can surely prevent the occurrence of the cracks is desired by the industry.

The present invention is made to solve the above-mentioned conventional problems, and successfully provides a method for producing a porous honeycomb structural body which shows the advantageous effects compared with the conventional method and is possible to prevent the occurrence of the cracks more surely.

The inventor of the present invention has made an intensive study to solve the above-mentioned problem and resultantly have obtained a novel finding that the cracks occur also even during the cooling process to cool the obtained fired body, not only during the temperature rising process during firing the body to be fired. Furthermore, the inventor of the present invention has completed the present invention by a novel constitution, not known before, which controls the temperature reducing speed of the cooling atmosphere strictly during the temperature reducing process which the obtained fired body is cooled, with realization that it is possible to solve the above-mentioned conventional problems are solved by using this method. That is, according to the present invention, the following method for producing a porous honeycomb structural body is provided.

[1] A method for producing a porous honeycomb structural body, comprising mixing and kneading step to obtain a green body by mixing and kneading a green body starting material containing aggregate material particles together with a dispersion medium, shaping and drying step to obtain a dried honeycomb body by shaping the green body to obtain a shaped honeycomb green body having a plurality of cells being divided and formed by partition walls and then by drying the resultant shaped honeycomb body, and firing and cooling step to obtain a porous honeycomb structural body by firing the dried honeycomb body to obtain a fired honeycomb body and cooling the fired honeycomb body, wherein said fired honeycomb body is cooled under a cooling atmosphere of 100° C./hour or less of temperature reducing speed, at least within a temperature range of 800° C. or less, at time of cooling a fired honeycomb body from a firing temperature.

[2] A method for producing a porous honeycomb structural body according to the above-mentioned [1], wherein said fired honeycomb body is cooled under a cooling atmosphere of temperature reducing speed, at least within a temperature range of 800° C. or less, in which temperature difference between the central portion of the fired honeycomb body and the atmospheric temperature of the cooling atmosphere is kept at less than 250° C.

[3] A method for producing a porous honeycomb structural body according to the above-mentioned [1], wherein said fired honeycomb body is cooled under the cooling atmosphere of temperature reducing speed, at least within a temperature range of 800° C. or less, in which temperature difference between the central portion of the fired honeycomb body and the atmospheric temperature of the cooling atmosphere is kept at less than 200° C.

[4] A method for producing a porous honeycomb structural body according to any one of the above-mentioned [1] to [3], wherein said fired honeycomb body is cooled under the cooling atmosphere of 200° C. /hour or less of temperature reducing speed in a temperature range of from the firing temperature to 800° C., and 100° C./hour or less of temperature reducing speed in a temperature range of less than 800° C.

[5] A method for producing a porous honeycomb structural body according to any one of the above-mentioned [1] to [3], wherein said fired honeycomb body is cooled under the cooling atmosphere of 200° C. /hour or less of temperature reducing speed in a temperature range of from the firing temperature to 800° C., and 50° C. /hour or less of temperature reducing speed in a temperature range of less than 800° C.

[6] A method for producing a porous honeycomb structural body according to any one of the above-mentioned [1] to [5], wherein a cordierite ($2MgO.2Al_2O_3. 5SiO_2$) forming material particles consisting of silica ($SiO_2$) particles, kaolin particles, alumina ($Al_2O_3$) particles, aluminum hydroxide ($Al(OH)_3$) particles, and talc ($3MgO.4SiO_2.H_2O$) particles are used as said aggregate material particles.

[7] A method for producing a porous honeycomb structural body according to any one of the above-mentioned [1] to [5], wherein said fired honeycomb body is further provided with plugged portions which plug alternately one opening of a plurality of the cells, and another opening of the cells; the plurality of the cells being divided and formed by partition walls.

[8] A method for producing a porous honeycomb structural body according to any one of the above-mentioned [1] to [5], wherein said fired honeycomb body has an apparent volume of 5 liter or more.

[9] A method for producing a porous honeycomb structural body according to any one of the above-mentioned [1] to [5], wherein said fired honeycomb body has a porosity of 50% or more.

[10] A method for producing a porous honeycomb structural body according to any one of the above-mentioned [1] to [5], wherein said fired honeycomb body has a plurality of cells being divided and formed by partition walls, and the partition walls have thickness of 150 µm or less.

The method for producing a porous honeycomb structural body of the present invention can exert such an advantageous effect that the occurrence of cracks is more surely prevented, as compared with the conventional method, because the occurrence of cracks can be effectively prevented during the temperature reducing process to cool the obtained fired body.

REFERENCE NUMERALS

Figure 1A:
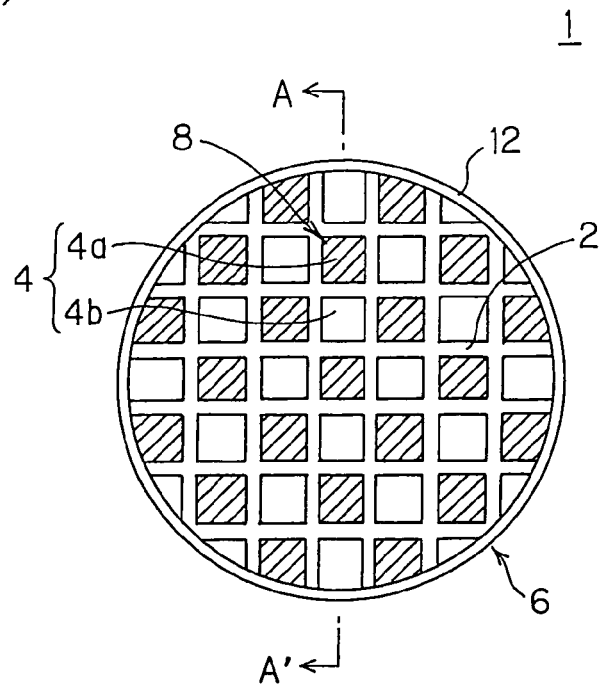
FIG. 1(a) is a schematic view of an embodiment of a conventional plugged honeycomb structural body, and this is a front view in which the plugged honeycomb structural body is seen from the direction of the cell opening end.
Figure 1B:
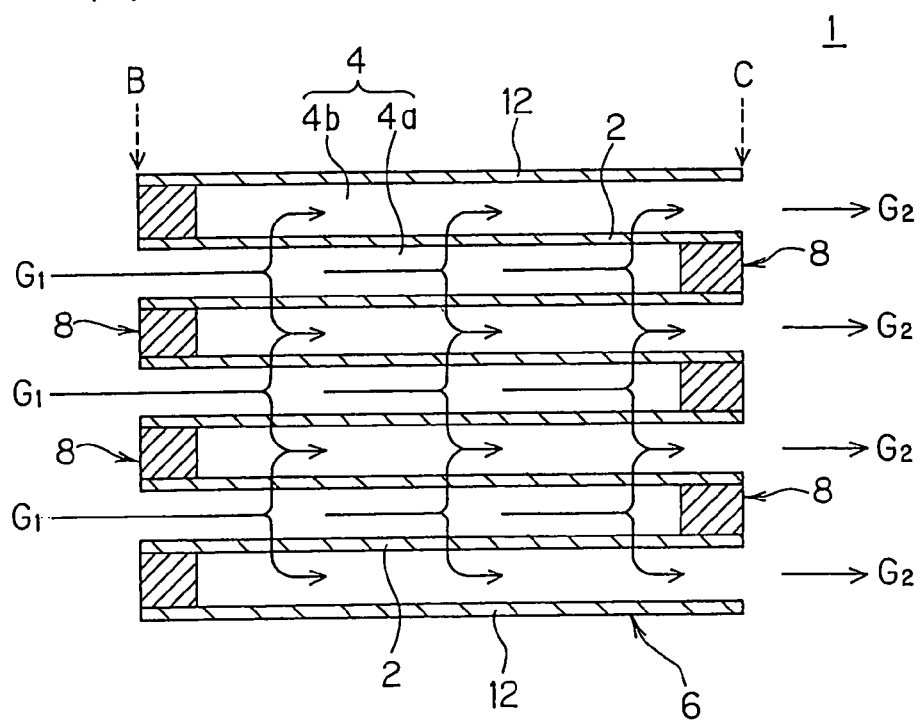
FIG. 1(b) is a schematic view of an embodiment of a conventional plugged honeycomb structural body, and this is the A-A' sectional view of the FIG. 1(a).

1: honeycomb filer, 2: partition wall, 4, 4a, 4b: cell, 6: a porous honeycomb structural body, 8: plugged portion, 12: outer wall, 21: fired honeycomb body, 31: testing instrument, 32: pedestal, 34: guide cylinder, 36: weight, 38: table, 40: lower mat, 42: black drawing paper, 44: porous honeycomb structural body, 46: upper mat, B: inlet side end face, C: outlet side end face, $G_1$: treating gas, $G_2$: treated gas.

BEST MODE FOR CARRYING OUT THE INVENTION

At the time of starting the research and development of the method for producing the porous honeycomb structural body of the present invention, the inventor of the present invention has carefully examined firstly the reasons why the occurrence of cracks can not still be prevented even though the controlling the rising temperature of the firing atmosphere is done strictly in the conventional producing method. As the result, it has been found the fact that the cracks of the porous honeycomb structural body occur not only during the temperature rising process to fire the body to be fired, but also during the temperature reducing process to cool the obtained fired body.

It has been considered heretofore that the occurrence of the cracks of the porous honeycomb structural body is caused by burning the inflammables contained in the body to be fired and the inner temperature of the body to be fired rises rapidly in the temperature rising process during firing the body to be fired. Therefore, it has been considered heretofore that the occurrence of cracks can be prevented by controlling the temperature rising speed of the firing atmosphere strictly not so as to make the difference between the temperature of the inner and that of outer portion of the body to be fired.

However, the fine cracks caused by breaking of the cordierite crystal grains are observed in a great number when the inventor has analyzed the porous honeycomb structural body which was produced by mixing and kneading the green body starting material containing cordierite forming material particles as aggregate particles with dispersion medium, shaping, drying, and firing. Therefore, it was thought that such fine cracks are produced during the temperature reducing process to cool the obtained fired body after the cordierite is synthesized by firing, because the cordierite crystallites should not yet be synthesized and exist yet during the temperature rising process to the firing temperature.

According to much more detailed observation, it has been found that, in case of the cracks occurred during the temperature rising process, there is a characteristic feature that there is no breakage of the crystallites at the part of the cracks and, once the cracks are formed, the cracks extend by firing shrinkage to make the slits opened widely: while, in case of the cracks occurred during the temperature reducing process, the breakages of the crystallites are recognized, but the cracks are too fine to observe with naked eyes.

As mentioned above, it is considered heretofore that the cracks of the porous honeycomb structural body occurs during the temperature rising process at the time of firing the body to be fired, therefore the temperature rising speed of the firing atmosphere is strictly controlled. However, it is the common understanding of those skilled in the art that the obtained fired body should be cooled quickly under the cooling atmosphere from the viewpoint of the productivity, because there is no idea at that time about the finding that the cracks occurs during the cooling process. That is, it is not possible to prevent the occurrence of the cracks surely because nobody paid attention the temperature reducing speed of the cooling atmosphere.

Therefore, it is made, in the present invention, that the temperature reducing speed of the cooling atmosphere during the temperature reducing process of the obtained fired body is controlled strictly. By employing this method, it is possible to prevent the occurrence of the cracks surely as compared with the conventional method, because it is possible to prevent effectively the occurrence of the cracks during the temperature reducing process to cool the obtained fired body. The best embodiments for carrying out the method for producing a porous honeycomb structural body of the present invention is herein below described concretely, but the present invention is not restricted at all by these embodiments.

Here, in the present specification, the word "average particle diameter" means the 50% particle diameter measured by the X-ray penetrating type grain size distribution measuring device (for example, the trade name: SediGraph 5000-02 type, Simadzu Corporation and so on) which has the measurement principle of the Stokes fluid phase sedimentation method and detects by X-ray penetrating method.

Also, in the present specification, the word "mean pore size" means the pore size measured by the mercury penetration method which has the measurement principle of the following expression (1) as the principle expression, and the calculated pore size from the pressure P at the time when the accumulated amount of mercury which is put into the porous body under pressure reaches to 50% of the total pore volume of the porous body:

$$d=-\gamma \times \cos \theta/P: \qquad (1)$$

(here, d: pore size, γ: surface tension between fluid — air interface, θ: contact angle, P: pressure)

Further, in the present specification, the word "porosity" means the porosity $P_0$ calculated based on by the following expression (2) from the total pore volume V of the porous body obtained by the above mentioned mercury penetration method and the absolute specific gravity $d_t$ of the constituent material of the porous body (2.52 g/m³, in case of cordierite)

$$P_0=V/(V+1/d_t) \times 100: \qquad (2)$$

(here, $P_0$: porosity, V: total pore volume, $d_t$: absolute specific gravity)

Furthermore, in the present specification, for the convenience of explanation, the word "fired honeycomb body" which is the structural body immediately after firing the dried honeycomb body and the word "porous honeycomb structural body" which the fired honeycomb body is cooled are distinguished in expression, but the both structures thereof are entirely same except each one differs temperature condition.

(1) Mixing and Kneading Step:
The first step of the producing method of the present invention is the mixing and kneading step to obtain a green body by mixing and kneading a green body starting material containing aggregate material particles with a dispersion medium.

(i) The Aggregate Material Particles:
The aggregate material particles are the particles which will become to be a material of the aggregate particle of main constituent of the porous honeycomb structural body (the fired body). As the aggregate material particles in the present invention, it is possible to use several kinds of ceramics or metal particles independently or mixed each other which are used as the main constituent for the porous honeycomb structural body heretofore. Above all, it is preferable to use the cordierite forming material, mullite, aluminum titanate, lithium aluminum silicate, silicon carbide, silicon nitride, or metal silicon, because it is possible to give the high heat resistance to obtained porous honeycomb structural body. The metal silicon is not ceramics, but it may be an aggregate particle for the metal silicon bonded silicon carbide (Si—SiC), for example.

In the present invention, the aggregate material particles may contain other constituents than above-mentioned constituent, but it is preferable that the ratio of the total mass of the above mentioned eight constituents to total mass of the all aggregate material particle is 50% by mass or more from the viewpoint of giving the high heat resistance surely to the obtained porous honeycomb structural body.

The "cordierite forming material particles" used in the present specification means the particles of the substance which will be converted into cordierite by firing. Usually, a mixture of the particles consisting of silica, alumina, magnesia, or a precursor thereof (hereinafter, written as "silica source", "alumina source", or "magnesia source") which will be the constituent of cordierite are preferably used so that the chemical composition after firing will be the theoretical composition ($2MgO.2Al_2O_3.5SiO_2$), more concretely, silica: 47-53% by mass, alumina: 32-38% by mass, and magnesia: 12-16% by mass.

Silica ($SiO_2$) itself represented by quartz, compound oxides containing silica such as kaolin ($Al_2O_3.2SiO_2.2H_2O$), talc (3MgO.4SiO$_2$.H$_2$O), or mullite (3Al$_2$O$_3$.2SiO$_2$) and so on, or a substance convertible into silica by firing can be given as a material for silica source.

Above all, it is preferable to use talc or kaolin. As will be mentioned later in the specification, the extrusion shaping to extrude from the dies which has slits having a shape complementarily with the partition walls to be formed is widely used as the shaping process, it has a preferable effect to reduce the thermal expansion of the finally obtained porous honeycomb structural body, because talc and kaolin are plate-like crystals and the plate-like crystals are oriented at the time of passing the slit of the dies.

The average particle diameter of the silica original material particles is not limited particularly, but it is used preferably if 5-50 μm in case of quartz particles, 2-10 μm or so in case of kaolin particles, 5-40 μm in case of talc particles, and about 2-20 μm in case of mullite particles.

As the alumina source, it is possible to mention the alumina itself, complex oxides containing alumina such as kaolin and mullite, or the materials which will be converted into alumina by firing such as aluminum hydrate (Al(OH)$_3$), and the like. However, it is preferable to use alumina or aluminum hydrate because it possible to obtain commercial items which has less impurities, and it is further preferable to use both of alumina and aluminum hydrate in combination. The average particle diameter of the alumina original material particles is not limited particularly, but it is used preferably if in the order of 1-10 μm in case of alumina particles, in the order of about 0.2-10 μm in case of aluminum hydrate particles.

As the magnesia source, it is possible to mention the magnesia itself, complex oxides containing magnesia such as talc, or the materials which will be converted into magnesia by firing such as magnesite (MgCO$_3$), and the like. The average particle diameter of the magnesia original material particles is not limited particularly, but it is used preferably if in the order of about 4-8 μm in case of magnesite particles.

Taking the above matters into consideration generally, it is preferable to use each particles, as the cordierite forming material particles to be cordierite, 5-25% by mass of silica particles (the average particle diameter 5-50 μm), 0-40% by mass of kaolin particles (the average particle diameter 2-10 μm), 5-35% by mass of alumina particles (the average particle diameter 1-10 μm), 0-25% by mass of aluminum hydrate particles (the average particle diameter 0.2-10 μm), and 35-45% by mass of talc particles (the average particle diameter 10-30 μm).

(ii) The Dispersion Madia:

As the dispersion media which is offered to the mixing and kneading with the aggregate material particles, it is mentioned water, and mixed solvent of water and organic solvents such as alcohol and so on, and particularly water is preferably used.

(iii) The Additive Agent:

The pore forming material is the additive agent which increases the porosity to obtain the high porosity porous honeycomb structural body, which is burned out to form pores at the time of firing the dried honeycomb body, it is necessary to be inflammable material which will be burned out during firing the dried honeycomb body. It is possible to mention, for example, carbon such as graphite, wheat flour, starch, phenolic resin, polymetacrylic acid methyl, polyethylene, polyethylene telephthalate and so on, but the micro capsule consisting of an organic resin such as acrylic resin and so on can be used preferably. The micro capsule has the advantages that it is possible to reduce the occurrence of thermal stress because it has less heat outbreak at the time of firing, in addition to having high pore forming effect because the micro capsule is hollow particles and is possible to obtain the high porosity honeycomb structural body with a small amount of addition.

The organic binder is the additive agent which gives fluidity to the green body at the time of honeycomb shaping, and it becomes gel condition in the dried honeycomb body before firing and carries out the function as the reinforcement agent maintaining the mechanical strength of the dried body. As the organic binder, for example, hydroxypropylmethyl cellulose, methyl cellulose, hydroxyethyl cellulose, carboxylmethyl cellulose, or polyvinylalcohol and so on are possible to use preferably.

The dispersant is the additive agent which promotes the dispersion of the aggregate material particles and so on into the dispersion medium vehicle to obtain a homogeneous green body. Therefore, the substances having surfactant effect, for example, ethyleneglycol, dextrin, fatty acid soap, poly alcohol and so on are possible to use preferably.

(iv) Mixing and Kneading:

The above mentioned aggregate material particles, dispersion medium, additive agent and so on are possible to mix and knead by conventionally known mixing and kneading process.

As to the mixing, it is possible to conduct by the any one of conventionally known mixer, for example, the sigma kneader, the ribbon mixer and so on. As to the kneading, it is possible to do by the conventionally known kneader, for example, the sigma kneader, the banbury mixer, screw type extruding kneader and so on. Using the kneading machine (so-called the de-airing pugmill or the two-axis continuous kneading extruder and so on) equipped with vacuum decompression equipment (vacuum pump and so on, for example) is preferable because it is possible to obtain the green body which has less defects and have good formability.

In the producing method of the present invention, it is preferable to obtain a green body extruded in a columnar shape by kneading by using the sigma kneader first, then further by kneading by using screw type kneading extruder equipped with the vacuum decompression equipment further.

(2) The Shaping and Drying Step:

The second step of the producing method of the present invention is the shaping and drying step by shaping the green body to obtain the shaped honeycomb body having a plurality of cells being divided and formed by the partition walls, then drying the shaped honeycomb body to obtain the dried honeycomb body.

Figure 2A:
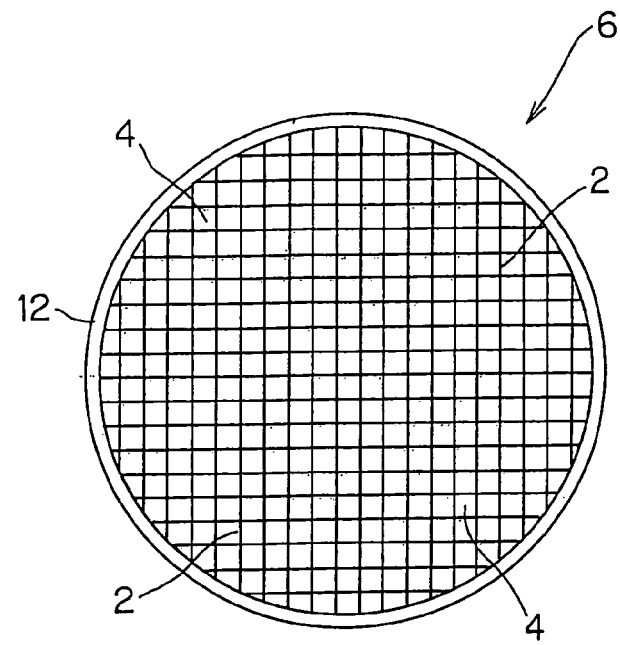
FIG. 2(a) is a schematic view of one example of a porous honeycomb structural body, and this is a front view in which the porous honeycomb structural body is seen from the direction of the cell opening end.
Figure 2B:
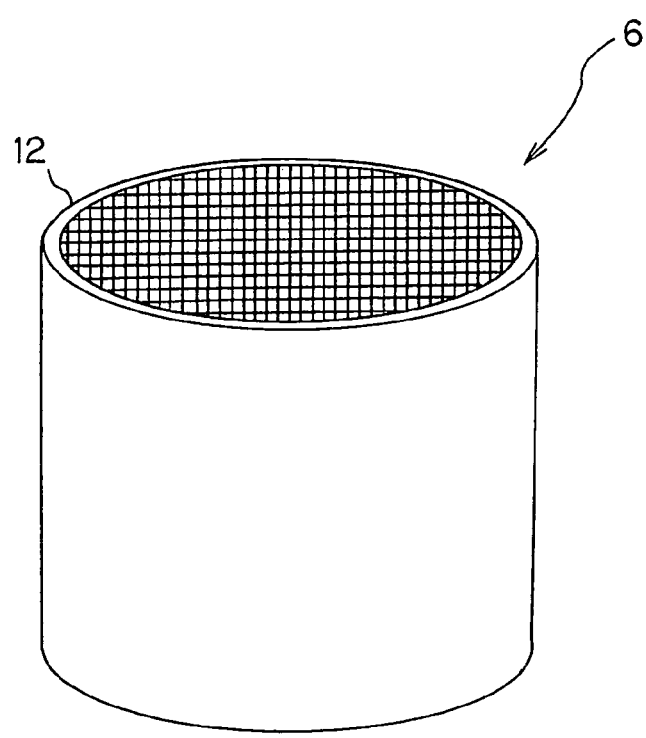
FIG. 2(b) is a schematic view of one example of a porous honeycomb structural body, and this is a perspective illustration of the porous honeycomb structural body.

The expression "honeycomb" used in the present specification means the shape having a plurality of cells 4 being divided and formed by the extremely thin partition walls 2, like the shaped honeycomb body 6 shown in FIG. 2(a) and FIG. 2(b), for example. As to the whole configuration of the honeycomb structural body is not limited particularly, but it is possible to mention, for example, quadratic prism, triangular prism and the like in addition to a columnar shape as shown in FIG. 2(a) and FIG. 2(b). Furthermore, also there is no particular limitation for the configuration of cells (cell configuration in the cross section perpendicular to the direction of the cell formation) of the shaped honeycomb body, it is possible to mention, for example, hexagonal, triangular or the like in addition to quadrangular as shown FIG. 2(a) and FIG. 2(b).

There is no particular limitation for shaping the honeycomb structural body, it is possible to use the conventionally known forming process such as extrusion forming, injection forming, and press forming and so on. Above all, it is preferable to shape by the extrusion shaping to extrude from the dies which has slits having a shape complementarily with the partition walls to be formed. This method is preferable in the point that it is possible to obtain simply the shaped honeycomb body which has a desired cell configuration, partition wall thickness, and cell density.

Also, there is no particular limitation for the method of drying, it is possible to use any conventionally known drying process such as hot air drying, micro wave drying, dielectric drying, decompression drying, vacuum drying, freeze drying and so on. Above all, it is preferable to use the combination drying process of hot air drying and micro wave drying or dielectric drying, because it is possible to dry quickly and uniformly the shaped body as a whole.

(3) The Firing and Cooling Step:

The third step of the producing method of the present invention is the firing and cooling step by firing the dried honeycomb body to obtain the fired honeycomb body, and cooling the fired honeycomb body to obtain the porous honeycomb structural body.

The firing means the operation which attains the predetermined mechanical strength by densifying the aggregate material particles by sintering. In the present invention, it is possible just to follow to the conventional known method, but the appropriate conditions should be chosen according to the kind of the aggregate material particle constituting the honeycomb structural body, because it differs from kind by kind. It is preferable to fire 1410-1440° C. for 3-12 hours when the cordierite forming material is used as the aggregate material particles, for example. If the firing conditions (temperature and hour) are less than the above-mentioned range, it is not preferable in the point that the sintering of the aggregate material particles may not be sufficient. And if exceeds the above-mentioned range, it is also not preferable in the point that the cordierite produced may be molten.

Here, it is preferable if the operation removing the inflammables (the organic binder, the pore forming materials, and the dispersant and so on) from the fired honeycomb body by burning (calcination) is done, because it is possible to more accelerate removing the inflammables. The calcination temperature should be in the order of about 200-1000° C., because the combustion temperature of the organic binders is in the order of about 180-300° C., and the combustion temperature of the pore forming materials is in the order of about 400° C. even in the highest case. The calcining time is not particularly limited, but it is in the order of about 10-150 hours usually.

The porous honeycomb structural body as the final product is obtained by cooling the fired honeycomb body obtained by the above-mentioned firing from firing temperature to the ordinary temperature, the producing method of the present invention is characterized in that the temperature reducing speed of the cooling atmosphere is controlled strictly during the temperature reducing process which the obtained fired body is cooled. Specifically, it is necessary to cool the fired honeycomb body under the cooling atmosphere of 100° C./hour or less of temperature reducing speed, at least within a temperature range of 800° C. or less, during cooling the fired honeycomb body from the firing temperature. By doing this, it is possible to more surely prevent the occurrence of cracks as compared with the conventional method, because it is possible to prevent cracks effectively which occur during the temperature reducing process.

As explained above, in the producing method of the present invention, it is necessary to cool the fired honeycomb body under the cooling atmosphere of 100° C./hour or less of temperature reducing speed, but it is preferable to cool under the cooling atmosphere of 50° C./hour or less of temperature reducing speed to prevent surely the cracks which occur during the temperature reducing process. The minimum temperature reducing speed is not particularly limited, but it is preferable to cool under the cooling atmosphere of 20° C./hour or more of temperature reducing speed in consideration with the productivity.

Furthermore, the producing method of the present invention is possible to obtain the effect to prevent cracks which occur during the temperature reducing process by cooling the fired honeycomb body under the cooling atmosphere of 100° C./hour or less of temperature reducing speed, but it is preferable to cool the fired honeycomb body under the cooling atmosphere of temperature reducing speed in which temperature difference between the central portion of the fired honeycomb body and the atmospheric temperature of the cooling atmosphere is kept 250° C. or less, and further preferable to cool the fired honeycomb body under the cooling atmosphere of temperature reducing speed in which temperature difference between the central portion of the fired honeycomb body and the atmospheric temperature of the cooling atmosphere is kept 200° C. or less. Needles to say, of course it is preferable to make the temperature difference between the central portion of the fired honeycomb body and the atmospheric temperature of the cooling atmosphere as close as possible to 0° C. from the viewpoint of preventing the crack. But it is not practical to use the temperature difference of 5° C. or less from the viewpoint of the productivity, and it is general to use the temperature difference of 5° C. or more.

The most appropriate conditions for temperature reducing speed differs according to the various conditions such as the materials of the fired honeycomb body (the kinds of the aggregate material particles and so on), the structure of the fired honeycomb body (apparent volume, porosity, thickness of the partition wall, cell density, bulk density and so on). Because it is most reasonable to decide the temperature reducing speed based on the difference of the inner and outer temperature to suppress the occurrence of the thermal stress, in order to prevent to the occurrence of cracks.

In order to attain "the temperature reducing speed in which temperature difference between the central portion of the honeycomb fired body and the atmospheric temperature of the cooling atmosphere is kept within 250° C. (or 200° C.) or less," it is possible to measure the temperature of the central portion of the fired honeycomb body and the atmospheric temperature of the cooling atmosphere by a thermocouple or the like, then to adjust the temperature reducing speed according to the behavior of the temperature of the central portion of the fired honeycomb body so that the temperature difference between both is kept within 250° C. (or 200° C.) or less. By doing this, the most preferable temperature reducing speed could be once determined, it is not necessary to adjust the temperature reducing speed in every fired honeycomb body, because it is possible to assume that temperature behavior of the fired honeycomb body is similar if the body has the similar various conditions such as materials and structures. That is, it is possible to produce continuously (mass production) by using the most appropriate conditions of temperature reducing speed which is determined at first.

As mentioned above, in the producing method of the present invention, it is necessary to cool the fired honeycomb body under the cooling atmosphere of 100° C./hour or less of temperature reducing speed in the predetermined temperature range, but it does not necessarily need to control to this temperature reducing speed at the temperature range from the firing temperature to 800° C.

In the temperature range from the firing temperature to 800° C., the frequency of the occurrence of cracks is low because the temperature difference between the inner and the outer portion of the fired body may be difficult to be appeared in the temperature range of the beginning of cooling, even if the fired body is cooled under the cooling atmosphere of 100° C./hour or less of temperature reducing speed. Therefore, there is no actual profit to control the temperature reducing speed strictly. From this reason, the temperature reducing speed in the temperature range from the firing temperature to 800° C. may be determined appropriately from the viewpoint of the productivity, the controlling of the property of the fired body, and the like. Generally, in this temperature range, it is preferable to cool the fired honeycomb body by the cooling atmosphere of the temperature reducing speed of 50-200° C. /hour, usually.

In the producing method of the present invention, the temperature reducing speed of the cooling atmosphere is controlled at least within a temperature range of 800° C. or less. The reason why the starting point of controlling the temperature reducing speed is 800° C. is as follows. That is, it is hardly occur any temperature difference between inner and outer portion of the fired honeycomb body at the beginning of the cooling (from the firing temperature to reach to the 800° C.), but the temperature of the central portion can not follow with the decrease of the temperature of the outer portion according to the progress of the cooling, then the temperature difference between the inner and the outer portion exceeds the allowable level. The terminal point of the controlling the temperature reducing speed is as low as possible from the viewpoint of preventing the occurrence of cracks. Specifically, it is preferable to control as low as 150° C., more preferably to 100° C.

Furthermore, the producing method of the present invention prevents the occurrence of cracks which are found during the temperature reducing process to cool the obtained fired body, whereby it is also preferable to employ the method which controls strictly the temperature rising speed of the firing atmosphere during the firing the body to be fired so that the temperature difference between the inner and outer portion of the body to be fired is not occur, in order to prevent the occurrence of cracks during the temperature rising process as conventionally done.

For example, as the applicant of the present invention also proposes, it is possible to use preferably the method for producing a porous ceramics structural body in which the burning of the organic binder progress as gentle as possible (that is, rising temperature gradually) under the firing atmosphere in which the temperature rising speed is controlled at the temperature zone in which the organic binder burns (in the order of about 180-300° C.) (see Japanese Patent No. 2543565, for example), and the method in which the temperature of the firing atmosphere is risen synchronizing with the temperature of the central portion of the fired body under predetermined temperature range (see JP-A-2003-212672, for example).

Also, it is preferable to use the method in which the temperature rising speed of the firing atmosphere in the temperature range of binder burning raises extremely so that the temperature of the firing atmosphere follows to the rapid temperature rising of the central portion of the body to be fired by burning of the organic binder. For example, it is possible to use the method in which the temperature rising speed from the burning starting temperature of the organic binder (usually, there is within the range of 180-300° C.) to 300° C. is 25° C./hour or more. This kind of method is possible to keep the temperature difference between the inner and outer of the body to be fired within 80° C. or less, or 50° C. or less depending on a condition, therefore, this kind of method is preferable in the point that it is possible to reduce the firing time greatly as compared with conventional methods and to promote the productivity, in addition to prevent cracks effectively during the temperature rising process.

Furthermore, it is also a preferable one embodiment to employ the method in which the temperature rising speed of the firing atmosphere during the talc dehydration temperature range (800-1000° C.) is controlled strictly, in case of containing the talc as the aggregate material particles. In case of containing the talc as the aggregate material particle, the outer temperature of the body to be fired rises at a constant speed with following the temperature rising speed of the firing atmosphere in the temperature range of 800-1000° C., on the contrary, the temperature of the central portion of the body to be fired rapidly reduces retrogressively with the temperature rising of the firing atmosphere by the dehydration from talc (endothermic reaction). Therefore, the inner and outer temperature difference of the body to be fired becomes large, then cracks may be occurred by thermal stress.

Therefore, it is preferable to control the temperature rising speed of the firing atmosphere low to 40° C./hour or less (that is, rising temperature gradually) in the temperature range of 800-1000° C. (talc dehydration temperature range), so that to correspond to the rapid temperature reduction of the central portion of the body to be fired by the endothermic reaction. This kind of method shows the effect to prevent effectively the cracks during the temperature rising process, because it is possible to keep the temperature difference, between the inner and outer of the body to be fired within 60° C. or less, or 40° C. or less depending on a condition. Particularly, this kind of method is preferably used in the production of the porous honeycomb structural body made of cordierite which uses talc generally as the one of the aggregate material particles.

Here, the present invention is particularly preferably used in case the structure of the fired honeycomb body is difficult to give the mechanical strength. The fired honeycomb body having these kind of structure is possible to enjoy the merit of the present invention, because cracks are conspicuously occurred in the temperature reducing process. As the structure which is difficult to give the mechanical strength, it is possible to mention, for example, the one which has plugged portion, the one which has thin partition walls, and the one which has high porosity and so on.

The fired honeycomb body having the plugged portion is possible to say as the structure which is difficult to give mechanical strength, because the non-plugged portion is fragile as compared with the plugged portion and the stress concentration is easy to occur on that portion. Therefore, it is possible to enjoy more the merit of the producing method of the present invention which prevents cracks effectively in the temperature reducing process when the fired honeycomb body is the one further having plugged portion which plugs alternately one opening of the plurality of cells and the other opening of the plurality of cells.

Here, the fired honeycomb body having the plugged portion is possible to obtain by adhering an adhesive sheet on the one end of the dried honeycomb body, forming apertures to only the portions of the sheet corresponding to the cells to be plugged by laser processing utilizing the image processing to form a mask, dipping the mask adhered end of the dried honeycomb body into the ceramic slurry, forming the plugged portion filled with ceramic slurry at the cells to be plugged of the dried honeycomb body, applying the same process mentioned above to the other end of the dried honeycomb body, drying the plugged portion, and then firing the plugged dried honeycomb body, for example.

The fired honeycomb body having high porosity is also possible to say as the structure which is difficult to give the mechanical strength, because the wall itself which maintains the mechanical strength is fragile. Therefore, it is possible to enjoy more the merit of the producing method of the present invention which prevents cracks effectively in the temperature reducing process when the dried honeycomb body is the one having high porosity of 50% or more, particularly 60% or more. The upper limitation of the porosity is not limited particularly, but it is preferable to be 65% or less from the viewpoints of production and the mechanical strength point of view of the fired honeycomb body.

Here, the high porosity fired honeycomb body having porosity of 50% or more is possible to obtain by forming a green body added 5 parts by mass of the micro capsule to 100 parts by mass of the aggregate material particles if the commercial micro capsule is used as the pore forming material, for example, shaping the green body to obtain the shaped honeycomb body, drying the shaped honeycomb body, and firing the body.

The fired honeycomb body having thin partition walls is also possible to say as the structure which is difficult to give the mechanical strength, because the wall itself which maintains the mechanical strength is fragile. Therefore, it is possible to enjoy more the merit of the producing method of the present invention which prevents cracks effectively in the temperature reducing process, when the dried honeycomb body has a plurality of cells being divided and formed by the partition walls and the thickness of the partition walls is as thin as 150 μm or less. The lower limitation of the thickness of the partition walls is not limited particularly, it can be determined appropriately in consideration with the production ability of the dies having slits, and formability and drying property of the shaped honeycomb body, and the like. In this regard, it is preferable to be 40 μm or more from the viewpoint that the partition walls can be industrially easily formed.

Here, the fired honeycomb body having thin partition wall as 150 μm or less is possible to obtain by the producing method comprising, for example, shaping the green body by extrusion shaping to extrude from the dies which has slits having a shape complementarily with the thin walls to be formed to obtain a shaped honeycomb body, drying and firing the obtained shaped honeycomb body.

Further, the producing method of the present invention is possible to use preferably to the structure which is easy to have temperature difference between the inner and outer portion. As the structure which is easy to have temperature difference between the inner and outer portion, it is possible to mention, for example, the one which has big size, and the one which the thickness of the partition wall is thick, or the like.

It is possible to say that the fired honeycomb body having big size is the structure which is easy to have temperature difference between the inner and outer portion, since the body has large heat capacity and the temperature of the cooling atmosphere is difficult to be transmitted to the central portion. Therefore, it is possible to enjoy more the merit of the producing method of the present invention which prevents cracks effectively in the temperature reducing process when the fired honeycomb body is the big type one having apparent volume of 5 liter or more, particularly 10 liter or more. The upper limitation of the apparent volume is not limited particularly, but it is preferable to be 75 liter or less from the viewpoint of production.

Here, the word "apparent volume" in the present specification means the volume including the space which the cells of the fired honeycomb body occupy. For example, the fired honeycomb body having the outer diameter of 250 mm and length of 300 mm has apparent volume of 15 liter irrespective of the cell structure.

It is also possible to say that the fired honeycomb body having thick partition wall is the structure which is easy to have temperature difference between the inner and outer portion, since the body has large heat capacity and the temperature of the cooling atmosphere is difficult to be transmitted to the central portion. Therefore, it is possible to enjoy more the merit of the producing method of the present invention which prevents cracks effectively in the temperature reducing process when the fired honeycomb body is the one having thick wall of the thickness of the partition walls, of 300 μm or more.

EXAMPLE

The present invention will be explained in more concretely by examples and comparative examples below, but the present invention is not restricted at all by these examples.

(Producing the Porous Honeycomb Structural Body)

The honeycomb structural bodies having the structure shown in the Table 1 to Table 3 were produced by the following process. As the aggregate material particles, the one was prepared containing the kaolin (the average particle diameter 11 μm), talc (the average particle diameter 21 μm), aluminum hydrate (the average particle diameter 2 μm), alumina (the average particle diameter 7 μm), and silica (the average particle diameter 25 μM) in the ratio of 18.5:40:15:14:12.5. As to those particles, the one was used in which the crude particles of 100 μm or more particle size were removed by air classification using the Alpine classifier.

5 parts by mass of the methylcellulose as an organic binder was added and mixed for 3 minutes to 100 parts by mass of the aggregate material particles, then 1.0 part by mass of the commercially available micro capsule made of acrylic resin as the pore forming material was added and mixed for 3 minutes to the mixture, and 25 parts by mass of water was added to the resulting mixture while spraying and mixed for 3 minutes.

Then, the mixture mentioned above was kneaded for 60 minutes by the sigma type kneader to obtain a green body, further the green body was kneaded and extruded by the de-airing pug mill under the vacuum condition of 8 kPa of the absolute pressure to obtain a columnar shaped green body (outer diameter of 300 mm).

The shaped honeycomb body was obtained by extrusion shaping method, to obtain a porous shaped honeycomb body having the apparent volume, the partition wall thickness, and the cell density as shown in the Table 1 to Table 3, using the dies which had slits having a shape complementarily with the partition walls to be formed to obtain a shaped honeycomb body which had a plurality of cell being divided and formed by the partition walls. Specifically, the green body was shaped by extrusion using the dies having slits arranged grid state in a predetermined interval and having the width corresponding to the thickness of the partition walls in order to form square cell configuration. This shaping was conducted by the ram type extruding former.

The dried honeycomb body was obtained by micro wave drying the above shaped honeycomb body, and further by hot air drying. The obtained dried honeycomb body was cut into predetermined size, and adhering an adhesive sheet on the one end of the dried honeycomb body, forming apertures to only the portions of the sheet corresponding to the cells to be plugged by laser processing utilizing the image processing to form a mask, dipping the mask adhered end of the dried honeycomb body into the ceramic slurry, forming the plugged portion filled with ceramic slurry at the cells to be plugged of the dried honeycomb body, applying also the same process mentioned above to the other end of the dried honeycomb body, drying the plugged portion, and then firing the plugged portion with the dried honeycomb body.

As the ceramic slurry for forming the plugged portion, using the same aggregate material particles with the one which was used for producing the porous honeycomb structural body, and it was used one which was prepared by mixing for 30 minutes 0.5 parts by mass of the methylcellulose as the binder, 0.3 parts by mass of the special carbonic acid type high molecular surfactant as the dispersant, 50 parts by mass of water as the dispersion medium to the 100 parts by mass of the aggregate material particles. The viscosity thereof was 25 Pa·s. Alternatively, it was made that the firing condition was 1420° C. and 6 hours. In this manner, the fired honeycomb body which further had the plugged portion plugged alternately one opening of a plurality of cells and the other opening of the cells, was obtained.

Figure 3A:
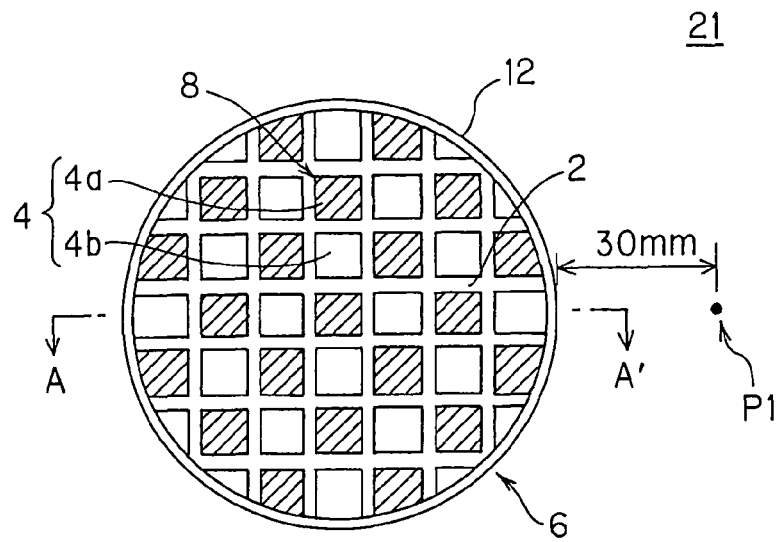
FIG. 3(a) is a schematic view showing a setting position of a thermocouple around a porous honeycomb structural body, and this is a front view in which the porous honeycomb structural body is seen from the direction of the cell opening end.
Figure 3B:
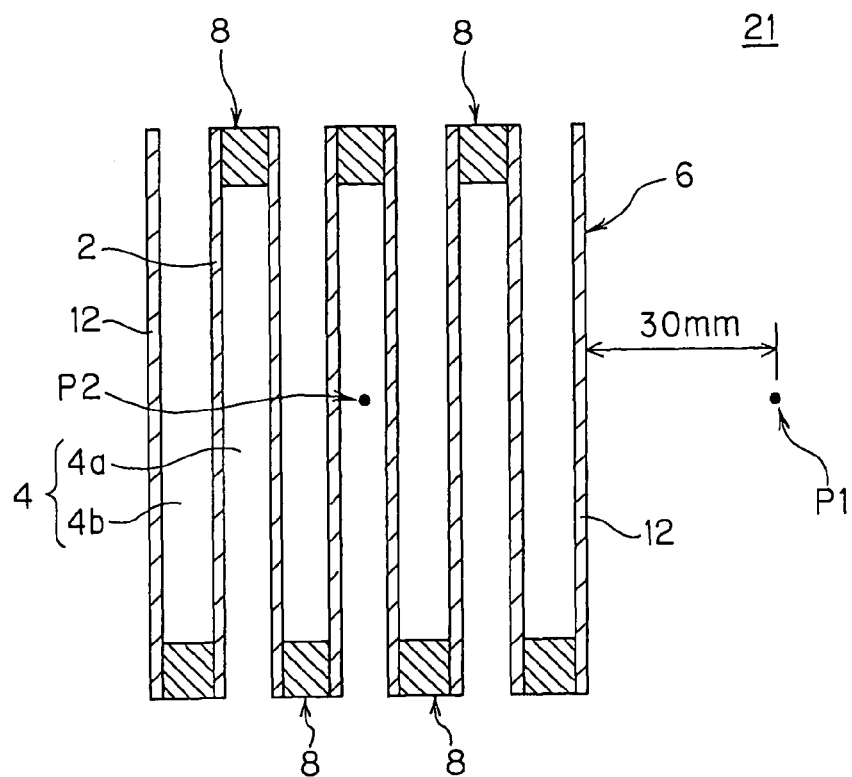
FIG. 3(b) is a schematic view showing a setting position of thermocouples in and around a porous honeycomb structural body, and this is the A-A' sectional view of the FIG. 3(a).

The porous honeycomb structural body was obtained by cooling the above-mentioned fired honeycomb body from the firing temperature to reach to 100° C. The porosity of these honeycomb structural body was 50%. As to the temperature reducing speed, it was controlled as shown in the Table 1 to Table 3. As to the examples and the comparative examples, ten porous honeycomb structural bodies were prepared by each condition. In this case, as to the one fired honeycomb body out of 10, the thermocouples were arranged at the position P1 and P2 as shown in the FIG. 3(a) and FIG. 3(b), the atmospheric temperature was measured by the thermocouple arranged at the position P1 and the temperature of the central portion of the fired honeycomb body 21 was measured by the thermocouple arranged at the position P2. Specifically, P1 was positioned at the 30 mm portion apart from the outer surface of the fired honeycomb body 31 and P2 was positioned at the midway point in the channel of the cell which was positioned at the center of the fired honeycomb body. Alternatively, the maximum temperature difference between both positions during the cooling process was indicated as "the inner and outer temperature difference."

TABLE 1

| | Structure of fired honeycomb body | | | | Temperature reducing speed | | | |
|---|---|---|---|---|---|---|---|---|
| | Apparent volume (L) | Partition wall thickness (μm) | Cell density (cell/cm²) | Porosity (%) | Firing temperature to 800° C. (° C./hour) | 800° C. or less (° C./hour) | Inner and outer temperature difference (° C.) | Rate of crack occurrence (%) |
| Com. Example 1 | 10 | 300 | 50 | 50 | 200 | 300 | 350 | 100 |
| Com. Example 2 | 10 | 300 | 50 | 50 | 200 | 200 | 280 | 80 |
| Example 1 | 10 | 300 | 50 | 50 | 200 | 100 | 140 | 0 |
| Example 2 | 10 | 300 | 50 | 50 | 200 | 50 | 60 | 0 |

TABLE 2

| | Structure of fired honeycomb body | | | | Temperature reducing speed | | | |
|---|---|---|---|---|---|---|---|---|
| | Apparent volume (L) | Partition wall thickness (μm) | Cell density (cell/cm²) | Porosity (%) | Firing temperature to 800° C. (° C./hour) | 800° C. or less (° C./hour) | Inner and outer temperature difference (° C.) | Rate of crack occurrence (%) |
| Com. Example 3 | 1 | 300 | 100 | 50 | 200 | 200 | 50 | 0 |
| Com. Example 4 | 5 | 300 | 100 | 50 | 200 | 200 | 180 | 0 |
| Com. Example 5 | 10 | 300 | 100 | 50 | 200 | 200 | 260 | 40 |
| Com. Example 6 | 25 | 300 | 50 | 50 | 200 | 200 | 420 | 100 |
| Example 3 | 1 | 300 | 100 | 50 | 200 | 100 | 20 | 0 |
| Example 4 | 5 | 300 | 100 | 50 | 200 | 100 | 50 | 0 |
| Example 5 | 10 | 300 | 100 | 50 | 200 | 100 | 140 | 0 |
| Example 6 | 14 | 300 | 100 | 50 | 200 | 100 | 180 | 0 |
| Example 7 | 17 | 300 | 50 | 50 | 200 | 100 | 240 | 20 |
| Example 8 | 25 | 300 | 50 | 50 | 200 | 100 | 260 | 40 |
| Example 9 | 25 | 300 | 50 | 50 | 200 | 50 | 200 | 0 |
| Example 10 | 50 | 300 | 50 | 50 | 200 | 25 | 140 | 0 |
| Example 11 | 75 | 300 | 50 | 50 | 200 | 25 | 200 | 5 |

TABLE 3

| | Structure of fired honeycomb body | | | | Temperature reducing speed | | | |
|---|---|---|---|---|---|---|---|---|
| | Apparent volume (L) | Partition wall thickness (μm) | Cell density (cell/cm²) | Porosity (%) | Firing temperature to 800° C. (° C./hour) | 800° C. or less (° C./hour) | Inner and outer temperature difference (° C.) | Rate of crack occurrence (%) |
| Com. Example 6 | 25 | 300 | 50 | 50 | 200 | 200 | 420 | 100 |
| Com. Example 7 | 25 | 350 | 50 | 50 | 200 | 200 | 440 | 100 |
| Com. Example 8 | 25 | 425 | 50 | 50 | 200 | 200 | 480 | 100 |
| Example 8 | 25 | 300 | 50 | 50 | 200 | 100 | 260 | 40 |
| Example 12 | 25 | 350 | 50 | 50 | 200 | 100 | 280 | 60 |
| Example 13 | 25 | 425 | 50 | 50 | 200 | 100 | 300 | 80 |
| Example 14 | 25 | 300 | 50 | 50 | 200 | 50 | 140 | 0 |
| Example 15 | 25 | 350 | 50 | 50 | 200 | 50 | 150 | 0 |
| Example 16 | 25 | 425 | 50 | 50 | 200 | 50 | 190 | 0 |

TABLE 4

| | Structure of fired honeycomb body | | | | Temperature reducing speed | | | |
|---|---|---|---|---|---|---|---|---|
| | Apparent volume (L) | Partition wall thickness (μm) | Cell density (cell/cm²) | Porosity (%) | Firing temperature to 800° C. (° C./hour) | 800° C. or less (° C./hour) | Inner and outer temperature difference (° C.) | Rate of crack occurrence (%) |
| Com. Example 9 | 10 | 100 | 50 | 30 | 200 | 200 | 210 | 40 |
| Com. Example 10 | 10 | 125 | 50 | 30 | 200 | 200 | 230 | 30 |
| Com. Example 11 | 10 | 150 | 50 | 30 | 200 | 200 | 260 | 30 |
| Example 17 | 10 | 100 | 50 | 30 | 200 | 100 | 130 | 0 |
| Example 18 | 10 | 125 | 50 | 30 | 200 | 100 | 140 | 0 |
| Example 19 | 10 | 150 | 50 | 30 | 200 | 100 | 160 | 0 |

TABLE 5

| | Structure of fired honeycomb body | | | | Temperature reducing speed | | | |
|---|---|---|---|---|---|---|---|---|
| | Apparent volume (L) | Partition wall thickness (μm) | Cell density (cell/cm²) | Porosity (%) | Firing temperature to 800° C. (° C./hour) | 800° C. or less (° C./hour) | Inner and outer temperature difference (° C.) | Rate of crack occurrence (%) |
| Com. Example 2 | 10 | 300 | 50 | 50 | 200 | 200 | 280 | 80 |
| Com. Exmaple 12 | 10 | 300 | 50 | 60 | 200 | 200 | 300 | 100 |
| Com. Example 13 | 10 | 300 | 50 | 65 | 200 | 200 | 270 | 100 |
| Example 1 | 10 | 300 | 50 | 50 | 200 | 100 | 140 | 0 |
| Example 20 | 10 | 300 | 50 | 60 | 200 | 100 | 210 | 0 |
| Example 21 | 10 | 300 | 50 | 65 | 200 | 100 | 180 | 0 |

Figure 4:
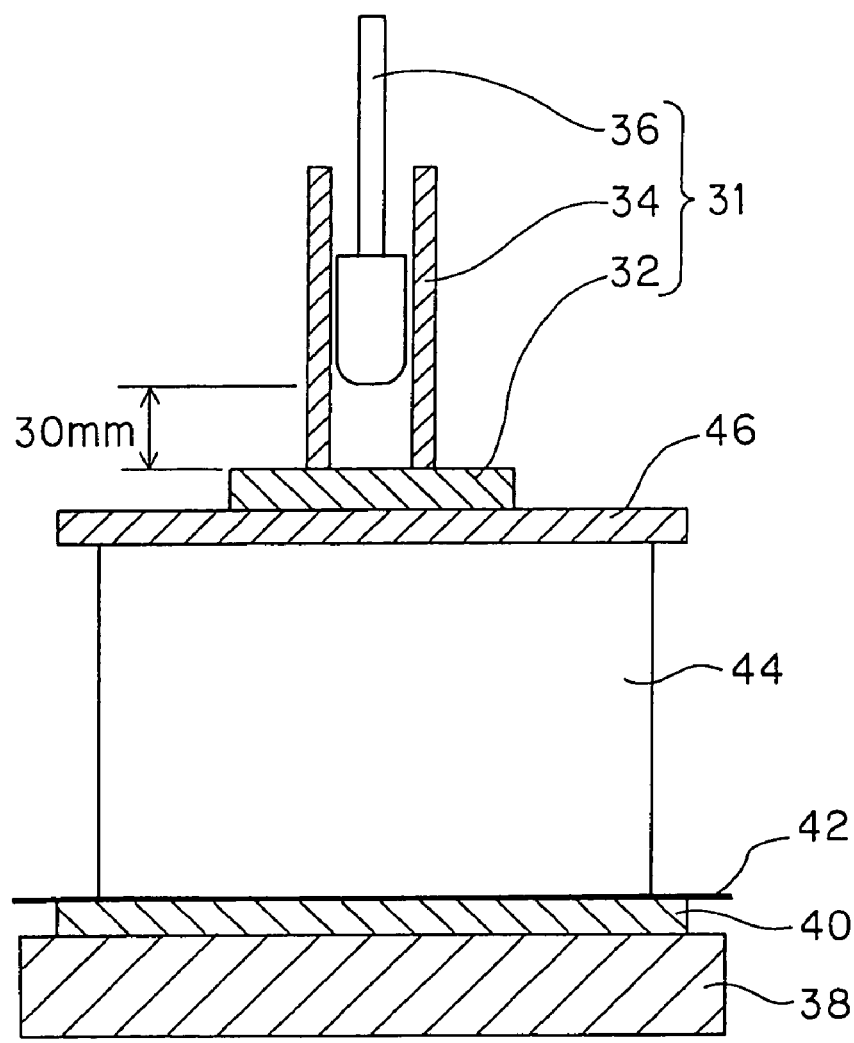
FIG. 4 is a schematic view showing a testing method of a porous honeycomb structural body.

[Evaluation of the Porous Honeycomb Structural Body]
As to the examples and the comparative examples, the rate (percent) which occurred cracks in the honeycomb structural body relating to the ten honeycomb structural body produced by each condition was calculated as "the rate of crack occurrence (%)," and the crack preventing effect was evaluated by this "the rate of crack occurrence (%)." Here, the presence of the cracks was confirmed by the following method using the testing instrument 31 shown in the FIG. 4.

The testing instrument 31 shown in the FIG. 4 is the instrument comprising the guide cylinder 34 having hollow cylindrical configuration fixed on the pedestal 32 in a protruding condition, and the weight 36 having bullet configuration loosely inserted in the guide cylinder 31, and this instrument is designed such that the weight 36 is raised to the desired heights along the guide cylinder 34 and the weight 36 is allowed to fall to the pedestal 32 by gravity.

As the testing method, the lower mat 40 made of urethane, the black drawing paper 42, the honeycomb structural body 44 to be tested were set sequentially on the table 38 in a layered-like, further the testing instrument 31 was set on the upper mat 46. Then the weight 36 of the testing instrument 31 was pulled up to the 30 mm height from the upper surface of the pedestal 32, then was fallen to the pedestal 32 by gravity to give slight shock to the honeycomb structural body 44.

When the porous honeycomb structural body 44 had cracks during the producing process, small pieces of crushed part originated from the crack portion of the body fall on the black drawing paper 42, and traces of the cracks of the porous honeycomb body were copied on the black drawing paper. Observing the traces of cracks by the naked eyes, and it was determined that the cracks exist if the traces longer than 10 mm length was recognized, and it was also determined that the cracks do not exist if the traces longer than 10 mm length was not recognized. Then, "the rate of crack occurrence (%)" was calculated.

As shown in the Table 1, by the conventional method in which temperature reducing speed under 800° C. was made faster than the temperature reducing speed from the firing temperature to 800° C. (that is, it was cooled rapidly under 800° C.), cracks were recognized in the all porous honeycomb structural bodies (Comparative Example 1). Alternatively, by the method in which temperature reducing speed under 800° C. was made same level with the temperature reducing speed from the firing temperature to 800° C. (that is, it was cooled uniformly from the firing temperature), the occurrence of racks were suppressed little bit, but cracks were still recognized in the 80% of porous honeycomb structural bodies (Comparative Example 2). By these methods, it could not be possible to keep the temperature difference between the inner and outer portion within 250° C. within a temperature range of 800° C. or less.

Contrary to this, by the method in which temperature reducing speed under 800° C. was made to be 100° C./hour or less, it was possible to keep the temperature difference between the inner and outer portion within 200° C., and the occurrence of cracks in the honeycomb structural body was not observed completely (Example 1 and Example 2).

The Table 2 was prepared about the influence which the apparent volume of the fired honeycomb body might give to the occurrence of cracks. As apparent from the Table 2, as to the honeycomb structural body having relatively small size of apparent volume of 1-5 liter, the occurrence of cracks was not recognized completely, because the heat was quickly transmitted to the central portion of the fired honeycomb body and the temperature difference between the inner and outer portion was kept within 200° C., even the temperature reducing speed under 800° C. was made same level with the temperature reducing speed from the firing temperature to 800° C. (Comparative Example 3 and Comparative Example 4).

However, as to the honeycomb structural body having relatively large size of apparent volume of 10 liter or more, the cracks occurred in the many porous honeycomb structural bodies, because the heat was hardly transmitted to the central portion of the fired honeycomb body and the temperature difference between the inner and outer portion was not kept within 250° C., if the temperature reducing speed under 800° C. was made same level with the temperature reducing speed from the firing temperature to 800° C. (Comparative Example 5 and Comparative Example 6).

Contrary to this, by the method in which temperature reducing speed under 800° C. was made to be 100° C./hour, it is possible to prevent the occurrence of cracks completely about the porous honeycomb structural body having the apparent volume of 1-14 liter (Example 3 to Example 6). As to the large porous honeycomb structural body having the apparent volume of 17-75 liter, the rate the occurrence of cracks were reduced greatly (Example 7 to Example 11).

Alternatively, as to the honeycomb structural body having the apparent volume of 25 liter, it was not possible to keep the inner and outer temperature difference within 250° C. even temperature reducing speed under 800° C. was made to be 100° C./hour or less. So, it was possible to keep the inner and outer temperature difference within 200° C. after temperature reducing speed under 800° C. was made to be 50° C./hour or less, then the occurrence of cracks were completely prevented (Example 9). That is, it was proved that the producing method of the present invention was particularly effective to the fired honeycomb body having relatively large size of the apparent volume of 5 liter or more, particularly 10 liter or more.

The Table 3 was prepared about the influence which the thickness of the partition walls of the fired honeycomb body might give to the occurrence of cracks. The honeycomb structural body having the thick wall of 300 μm or more of the thickness of the partition walls had large heat capacity. The temperature difference between the inner and outer portion could not kept within 250° C. if the temperature reducing speed under 800° C. was made same level with the temperature reducing speed from the firing temperature to 800° C., then the cracks occurred in the all the porous honeycomb structural bodies (Comparative Example 6 to Comparative Example 8).

Contrary to this, by the method in which temperature reducing speed under 800° C. was made to be 100° C./hour, the rate of the occurrence of cracks were reduced remarkably in the partition wall thickness of 300 μm or more of the honeycomb structural body (Example 8, Example 12 and Example 13). Alternatively, as to the honeycomb structural body having the thicker walls of 300 μm or more of the thickness of the partition walls, it is not possible to keep the inner and outer temperature difference within 250° C. even temperature reducing speed under 800° C. was made to be 100° C./hour. So, it was possible to keep the inner and outer temperature difference within 200° C. after temperature reducing speed under 800° C. was made to be 50° C./hour, then the occurrence of cracks were completely prevented (Example 14 to Example 16). That is, it was proved that the producing method of the present invention was particularly effective to the fired honeycomb body having relatively thicker walls of 300 μm or more of the thickness of the partition walls.

The Table 4 was also prepared about the influence which the thickness of the partition walls of the fired honeycomb body might give to the occurrence of cracks. As seen from the Table 4, as to the fired honeycomb body having the partition wall thickness of 150 μm or less, the wall itself which maintained the mechanical strength was fragile. The temperature difference between the inner and outer portion could not kept within 200° C. if the temperature reducing speed under 800° C. was made same level with the temperature reducing speed from the firing temperature to 800° C., then the cracks occurred in many porous honeycombs structural bodies (Comparative Example 9 to Comparative Example 11).

Contrary to this, by the method in which temperature reducing speed under 800° C. was made to be 100° C./hour, it was possible to prevent the occurrence of cracks completely (Example 17-Example 19). That is, it was proved that the producing method of the present invention was particularly effective to the fired honeycomb body having relatively thin wall of 150 μm or less of the thickness of the partition walls.

The Table 5 was prepared about the influence which the porosity of the fired honeycomb body might give to the occurrence of cracks. As seen from the Table 5, as to the fired honeycomb body having the porosity of 50% or more, the partition wall itself which maintained the mechanical strength was fragile. The temperature difference between the inner and outer portion could not kept within 250° C. if the temperature reducing speed under 800° C. was made same level with the temperature reducing speed from the firing temperature to 800° C., then the cracks occurred in the porous honeycomb structural bodies (Comparative Example 2, Comparative Example 12, and Comparative Example 13). Particularly, as to the porous honeycomb structural body having the porosity of 60% or more, the cracks occurred in the all porous honeycomb structural body (Comparative Example 12 and Comparative Example 13).

Contrary to this, by the method in which temperature reducing speed under 800° C. was made to be 100° C./hour, it was possible to prevent the occurrence of cracks completely (Example 8, Example 20, and Example 21). That is, it was proved that the producing method of the present invention was effective to the high porosity fired honeycomb body having porosity of 50% or more, above all, particularly 60% or more.

INDUSTRIAL APPLICABILITY

The method for producing a porous honeycomb structural body of the present invention shows the advantageous effects compared with the conventional method and is possible to prevent-the occurrence of the cracks more surely, because it is possible to prevent cracks effectively which occur during the temperature reducing process to cool the obtained fired body. Accordingly, the method for producing a porous honeycomb structural body of the present invention can be used particularly preferably for producing the porous honeycomb structural body having the structure which is difficult to give the mechanical strength (the one having the plugged portion, the one having thin partition walls, the one having high porosity, and so on), and the porous honeycomb structural body having the structure which is easy to have temperature difference between the inner and outer portion (the one having size in big, the one having thick partition walls, and so on).

The invention claimed is:

1. A method for producing a porous honeycomb structural body with an apparent volume of at least 10 liters and at most 75 liters, the apparent volume being a volume including a space that cells of the porous honeycomb structural body occupy, the method comprising:
   mixing and kneading steps to obtain a green body by mixing and kneading a green body starting material containing aggregate material particles together with a dispersion medium,
   shaping and drying steps to obtain a dried honeycomb body by shaping the green body to obtain a shaped honeycomb green body having a plurality of cells being divided and formed by partition walls and then by drying the resultant shaped honeycomb body, and
   firing and cooling steps to obtain a porous honeycomb structural body by firing the dried honeycomb body to obtain a fired honeycomb body and cooling the fired honeycomb body, wherein the fired honeycomb body is cooled under a cooling atmosphere of 200° C./hour or less temperature reducing speed in a temperature range of from the firing temperature to 800° C., and 100° C./hour or less temperature reducing speed in a temperature range of less than 800° C., the fired honeycomb body being cooled under conditions in which a temperature difference between a central portion of the fired honeycomb body and an atmospheric temperature of the cooling atmosphere is kept at less than 250° C., thereby substantially preventing a formation of fine cracks in the fired honeycomb body during the cooling step and after a cordierite material is formed by firing, and wherein cordierite ($2MgO.2Al_2O_3.5SiO_2$) forming material particles consisting of silica ($SiO_2$) particles, kaolin particles, alumina ($Al_2O_3$) particles, aluminum hydroxide ($Al(OH)_3$) particles, and talc ($3MgO.4SiO_2.H_2O$) particles are used as the aggregate material particles.

2. A method for producing a porous honeycomb structural body according to claim 1, wherein the fired honeycomb body is cooled under conditions in which the temperature difference between the central portion of the fired honeycomb body and the atmospheric temperature of the cooling atmosphere is kept at less than 200° C.

3. A method for producing a porous honeycomb structural body according to claim 1, wherein said fired honeycomb body is cooled under the cooling atmosphere of 50° C./hour or less of temperature reducing speed in a temperature range of less than 800° C.

4. A method for producing a porous honeycomb structural body according to claim 1, wherein said fired honeycomb body is further provided with plugged portions which plug alternately one opening of a plurality of the cells, and another opening of the cells; the plurality of the cells being divided and formed by partition walls.

5. A method for producing a porous honeycomb structural body according to claim 1, wherein the apparent volume is at least 29 liters and at most 75 liters.

6. A method for producing a porous honeycomb structural body according to claim 1, wherein said fired honeycomb body has a porosity of 50% or more.

7. A method for producing a porous honeycomb structural body according to claim 1, wherein said fired honeycomb body has a plurality of cells being divided and formed by partition walls, and the partition walls have thickness of 150 μm or less.

8. A method for producing a porous honeycomb structural body according to claim 1, wherein the firing occurs at 1410-1440° C. for sufficient sintering of the aggregate material particles, and a temperature of the aggregate material particles does not exceed a molten temperature of the cordierite material formed from the firing.

9. A method for producing a porous honeycomb structural body according to claim 1, wherein the apparent volume is at least 50 liters and at most 75 liters.

* * * * *